(12) United States Patent
Bowers

(10) Patent No.: US 10,800,251 B2
(45) Date of Patent: *Oct. 13, 2020

(54) HEAT BAFFLE CLIP SHIELD

(71) Applicant: Honda Motor Co., Ltd., Tokyo (JP)

(72) Inventor: Shawn L Bowers, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 16/171,687

(22) Filed: Oct. 26, 2018

(65) Prior Publication Data
US 2019/0061516 A1 Feb. 28, 2019

Related U.S. Application Data

(62) Division of application No. 15/084,703, filed on Mar. 30, 2016, now Pat. No. 10,131,223.

(51) Int. Cl.
*B60K 15/03* (2006.01)
*B60K 13/04* (2006.01)

(52) U.S. Cl.
CPC .............. *B60K 15/03* (2013.01); *B60K 13/04* (2013.01); *B60K 2015/0344* (2013.01); *B60K 2015/03421* (2013.01); *B60K 2015/03486* (2013.01)

(58) Field of Classification Search
CPC ............ B60K 15/03; B60K 2015/0344; B60K 2015/03486; B60K 2015/03467
See application file for complete search history.

(56) References Cited

U.S. PATENT DOCUMENTS

| 4,214,505 A | * | 7/1980 | Aimar | F16B 5/126 24/350 |
| 4,406,033 A | * | 9/1983 | Chisholm | A47G 27/0418 16/4 |
| 4,884,716 A | * | 12/1989 | Steiner | B60K 15/04 220/202 |
| 4,895,268 A | * | 1/1990 | Hyde | B29C 49/4802 220/675 |
| 4,948,319 A | * | 8/1990 | Day | F16B 1/0071 411/377 |
| 4,974,743 A | * | 12/1990 | Sasaki | B60K 15/077 220/363 |

(Continued)

FOREIGN PATENT DOCUMENTS

| CN | 101117971 A | 2/2008 |
| CN | 204821133 A | 12/2015 |

(Continued)

*Primary Examiner* — Steven A. Reynolds
*Assistant Examiner* — Javier A Pagan
(74) *Attorney, Agent, or Firm* — American Honda Motor Co., Inc.; Mark E. Duell

(57) ABSTRACT

A baffle clip shield for protecting a clip attaching a baffle to a fuel tank to protect the fuel tank from heat from an exhaust chamber located near the fuel tank is disclosed. The clip shield includes a spring foot extending from the rear side of the clip shield, the spring foot having a hook distal end that is pushed radially inward by the inclined wall as the clip shield is installed, the hook distal end of the spring foot being insertable into a hole in the inclined wall of the clip receiving portion, the hook distal end moving radially outward when installed in the hold, the hook distal end creating an interference fit with the inclined wall to prevent removal of the clip shield.

19 Claims, 4 Drawing Sheets

(56) References Cited

U.S. PATENT DOCUMENTS

| | | | | |
|---|---|---|---|---|
| 5,827,029 | A * | 10/1998 | Denman | F16B 41/005<br>411/373 |
| 5,879,117 | A * | 3/1999 | Chen | B60R 13/105<br>411/372.6 |
| 6,276,201 | B1 * | 8/2001 | Gette | B60K 15/077<br>220/4.12 |
| 6,314,995 | B1 * | 11/2001 | Meyer | B60K 15/077<br>137/565.22 |
| 6,433,278 | B1 * | 8/2002 | Blank | H01R 4/34<br>16/2.2 |
| 7,047,708 | B2 * | 5/2006 | Inada | A61J 1/1462<br>53/400 |
| 7,384,225 | B2 * | 6/2008 | Woolstencroft | F16B 37/14<br>411/372.6 |
| 8,282,327 | B2 * | 10/2012 | Miyagawa | F16B 41/002<br>411/372.6 |
| 10,131,223 | B2 * | 11/2018 | Bowers | B60K 15/03 |
| 2007/0253795 | A1 * | 11/2007 | Woolstencroft | F16B 37/14<br>411/429 |
| 2008/0286070 | A1 * | 11/2008 | Chiou | F16B 37/14<br>411/372.5 |
| 2009/0231814 | A1 * | 9/2009 | Liao | H01L 23/34<br>361/704 |
| 2011/0139793 | A1 * | 6/2011 | Park | B60K 15/077<br>220/563 |
| 2013/0160274 | A1 * | 6/2013 | De Man | B29C 66/12423<br>29/428 |
| 2014/0165369 | A1 * | 6/2014 | Chan | F16B 33/004<br>29/525.11 |
| 2015/0231967 | A1 * | 8/2015 | Topolovec | B60K 15/04<br>220/86.2 |

FOREIGN PATENT DOCUMENTS

| | | |
|---|---|---|
| DE | 102007056672 A1 | 5/2009 |
| EP | 2505857 A1 | 10/2012 |
| JP | 2007331643 A | 12/2007 |

* cited by examiner

SECTION A-A

HEAT BAFFLE CLIP SHIELD

TECHNICAL FIELD

The embodiments described herein relate to the field of heat baffles for fuel tanks of a motor vehicle, and more particularly heat shields for heat baffle clips.

BACKGROUND

Typically, a motor vehicle includes a fuel tank for holding fuel such as gasoline or diesel fuel, and an exhaust system, which includes an exhaust pipe and at least one exhaust chamber for carrying, treating, and muffling exhaust gases from the engine to a tail pipe for emission. Due to the high temperatures of exhaust from a gasoline engine, a metal heat baffle may be attached to the fuel tank to protect the fuel tank from the heat of the exhaust system by a series of plastic clips. However, a need to protect the clips from the exhaust heat has also been identified.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a fuel tank for a motor vehicle includes a fuel tank body, a baffle to protect the fuel tank body from heat from an exhaust chamber located near the fuel tank body, a clip for attaching the baffle to the fuel tank body, the clip being inserted through a hole in the baffle and received by a clip receiver in the fuel tank body, and a clip shield secured to the baffle to cover the clip. The baffle includes a clip receiving portion formed in the baffle having a generally frusto-conical shape, the clip receiving portion having a base portion recessed from a planar surface of the baffle, the clip receiving portion having a hole in the base through which a clip is inserted, and an inclined wall extending from the base to the planar surface of the baffle, the inclined wall having a first radius about an axis perpendicular to the base at the base and a second radius about the axis at the planar surface, the second radius being greater than the first radius, the inclined wall having a hole between the planar surface and clip receiving portion. The clip shield includes a solid body having a radius substantially similar to the second radius of the clip receiving portion, a front side facing the exhaust chamber, and a rear side facing the baffle, and a spring foot extending from the rear side of the clip shield, the spring foot having a hook distal end that is pushed radially inward by the inclined wall as the clip shield is installed, the hook distal end of the spring foot being insertable into the hole in the inclined wall of the clip receiving portion, the hook distal end moving radially outward when installed in the hold, the hook distal end creating an interference fit with the inclined wall to prevent removal of the clip shield.

According to another aspect, a baffle for protecting a fuel tank of a motor vehicle from heat from an exhaust chamber of the motor vehicle includes a baffle body, a clip receiving portion formed in the baffle body having a generally frusto-conical shape, the clip receiving portion having a base portion recessed from a planar surface of the baffle, the clip receiving portion having a hole in the base through which a clip is inserted, and an inclined wall extending from the base to the planar surface of the baffle body, the inclined wall having a first radius about an axis perpendicular to the base at the base and a second radius about the axis at the planar surface, the second radius being greater than the first radius, the inclined wall having a hole between the planar surface and clip receiving portion. The baffle further includes a clip for attaching the baffle to the fuel tank body, the clip being inserted through a hole in the baffle and received by a clip receiver in the fuel tank body, and a clip shield secured to the baffle body to cover the clip. The clip shield includes a solid body having a radius substantially similar to the second radius of the clip receiving portion, a front side facing the exhaust chamber, and a rear side facing the baffle body, and a spring foot extending from the rear side of the clip shield, the spring foot having a hook distal end that is pushed radially inward by the inclined wall as the clip shield is installed, the hook distal end of the spring foot being insertable into the hole in the inclined wall of the clip receiving portion, the hook distal end flexing radially outward when installed in the hold, the hook distal end creating an interference fit with the inclined wall to prevent removal of the clip shield.

According to yet another aspect, a baffle clip shield for protecting a clip attaching a baffle to a fuel tank to protect the fuel tank from heat from an exhaust chamber located near the fuel tank, a clip receiving portion formed in the baffle having a generally frusto-conical shape, the clip receiving portion having a base portion recessed from a planar surface of the baffle, the clip receiving portion having a hole in the base through which a clip is inserted, and an inclined wall extending from the base to the planar surface of the baffle, the inclined wall having a first radius about an axis perpendicular to the base at the base and a second radius about the axis at the planar surface, the second radius being greater than the first radius, the inclined wall having a hole between the planar surface and clip receiving portion includes a solid body having a radius substantially similar to the second radius of the clip receiving portion, a front side facing the exhaust chamber, and a rear side facing the baffle, and a spring foot extending from the rear side of the clip shield, the spring foot having a hook distal end that is pushed radially inward by the inclined wall as the clip shield is installed, the hook distal end of the spring foot being insertable into the hole in the inclined wall of the clip receiving portion, the hook distal end moving radially outward when installed in the hold, the hook distal end creating an interference fit with the inclined wall to prevent removal of the clip shield.

The figures depict various embodiments of the embodiments for purposes of illustration only. One skilled in the art will readily recognize from the following discussion that alternative embodiments of the structures and methods illus-

DETAILED DESCRIPTION

Figure 1:
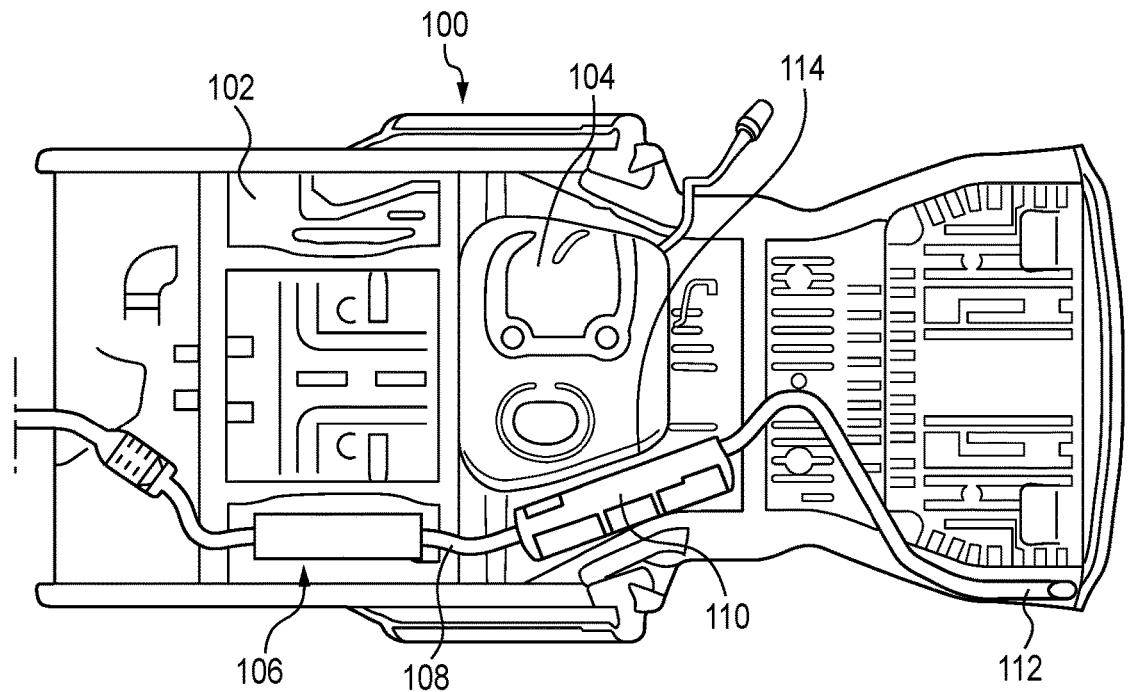
FIG. 1 is a bottom view of a motor vehicle.

FIG. 1 shows an embodiment of the bottom 102 of a motor vehicle 100. The motor vehicle includes a fuel tank 104 for holding fuel such as gasoline or diesel fuel, and an exhaust system 106, which includes an exhaust pipe 108 and at least one exhaust chamber 110 for carrying, treating, and muffling exhaust gases from the engine (not shown) to a tail pipe 112 for emission. Due to the high temperatures (900-1400° F.) of exhaust from a gasoline engine, a metal heat baffle 114 is attached to the fuel tank 104 to protect the fuel tank 104 from the heat of the exhaust system 106.

Figure 2:
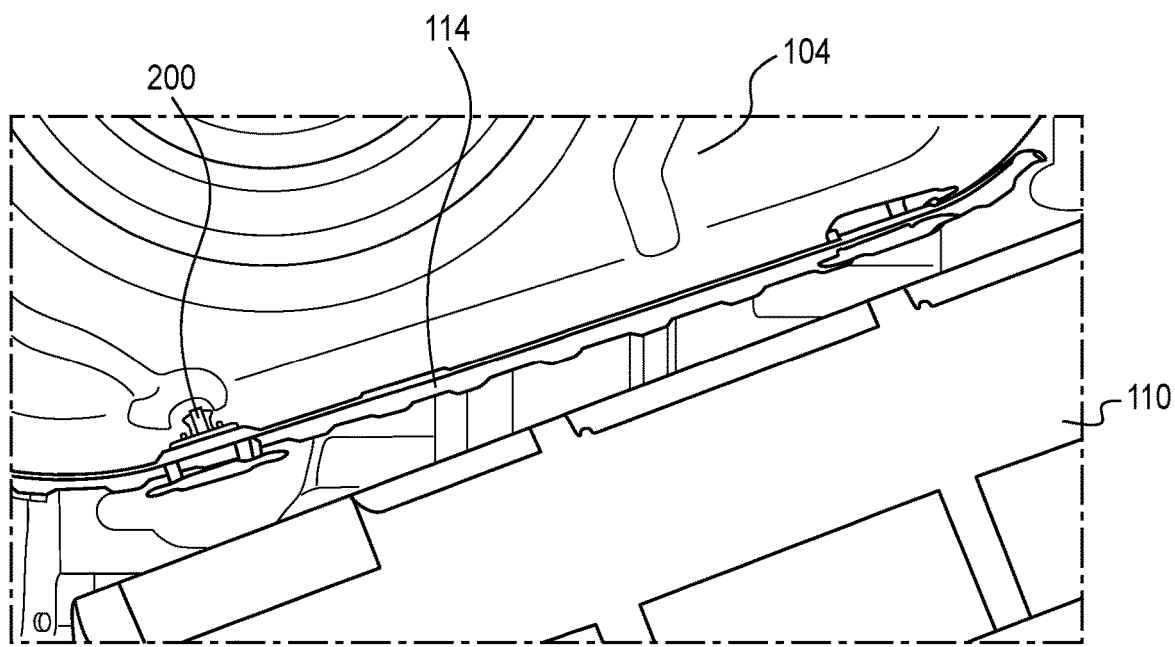
FIG. 2 is a close up of a portion of FIG. 1 showing a heat baffle.
Figure 3:
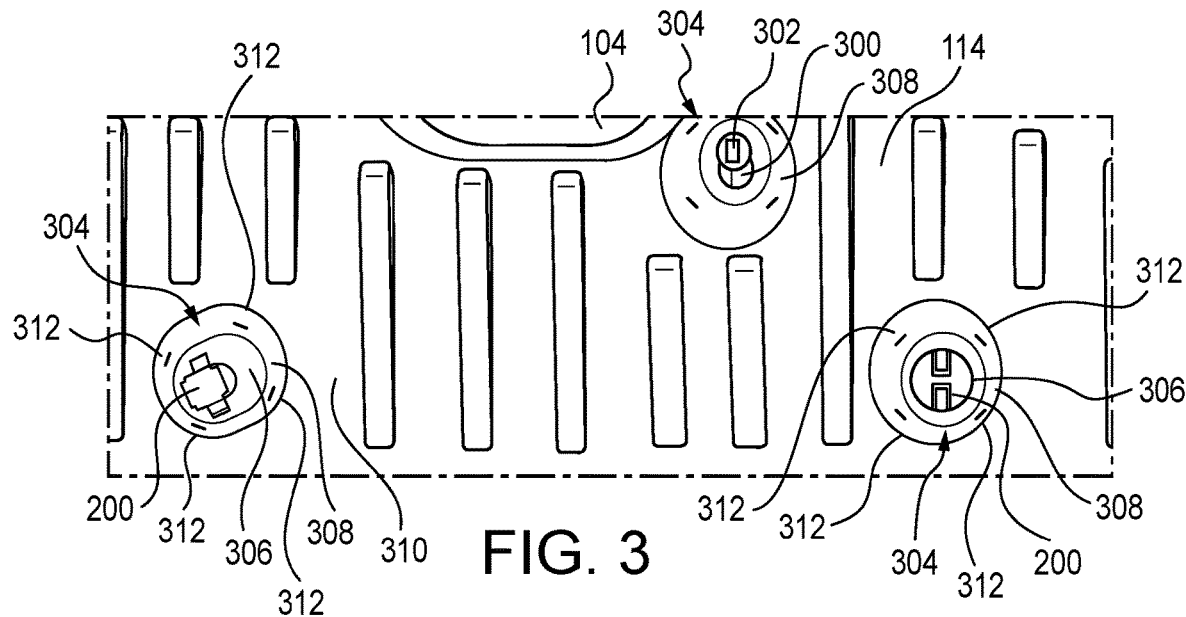
FIG. 3 is a side view of a heat baffle.

FIG. 2 is a close up bottom view of the heat baffle 114 that is attached to the fuel tank 104 to protect the fuel tank 104 from the heat of the neighboring exhaust chamber 110. The heat baffle 114 shields the fuel tank 104 from the heat of the exhaust chamber 110, and dissipates the heat over a greater surface area to prevent damage to the fuel tank 104. As shown in FIG. 2, the heat baffle 114 is connected to the fuel tank 104 by a series of clips 200 that are insertable in one direction through a hole 300 in the heat baffle 104 into a clip receiver 302 in the fuel tank 104, illustrated in FIG. 3.

Figure 4:
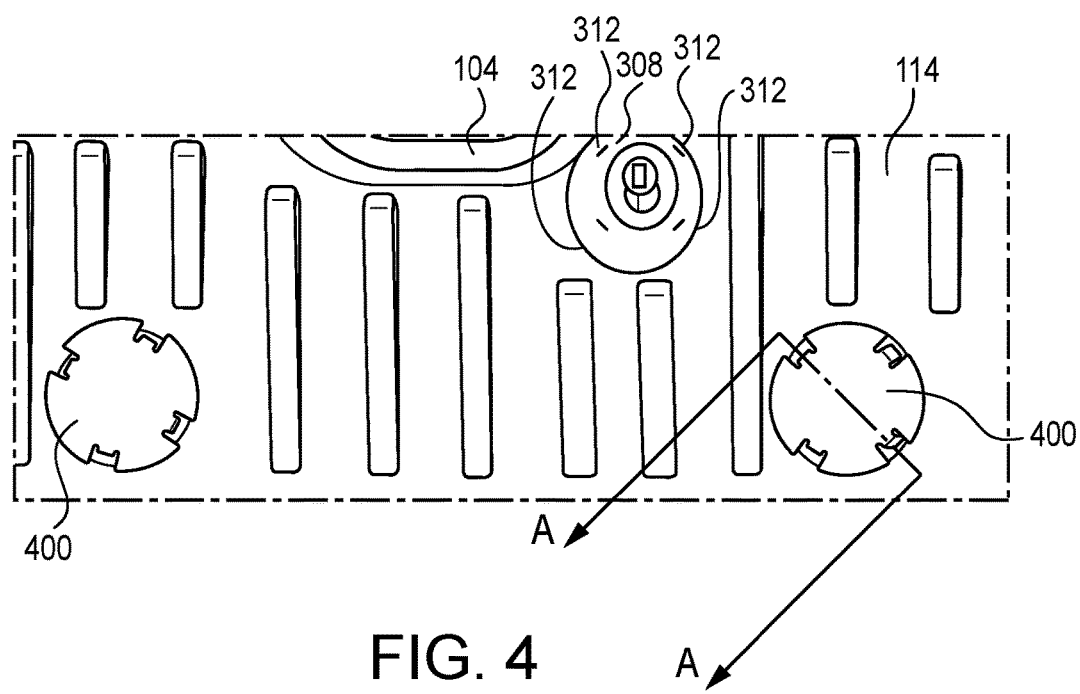
FIG. 4 is a side view of a heat baffle with clip heat shields installed.
Figure 5:
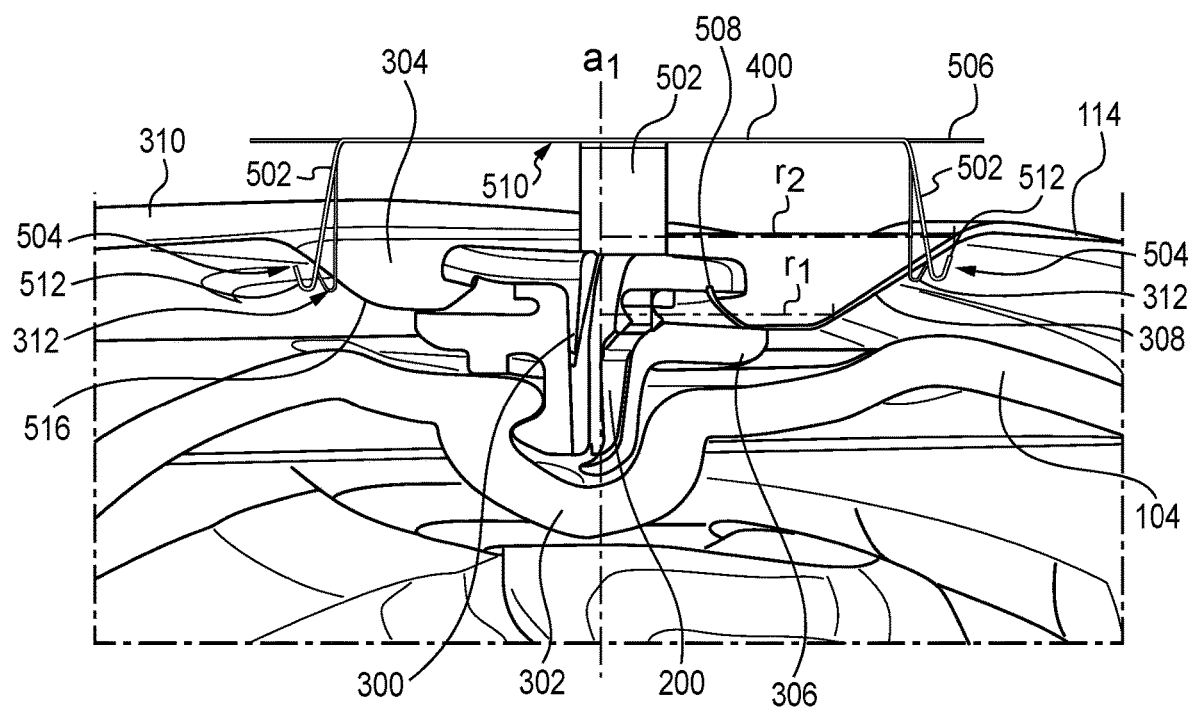
FIG. 5 is a cross-section along line A-A in FIG. 4.

It is preferable that these clips 200 are made of plastic to maximize performance. However, the plastic clips 200 may fail if exposed to the exhaust heat. Therefore, as shown in FIG. 4, clips 200 may be covered by a heat clip shield 400 that covers the clips 200 of FIG. 3.

As illustrated in FIGS. 3-7, a frusto-conical recess 304 is formed in the heat baffle 114. At the base 306 of the recess 304 is the hole 300 through which the clip 200 is inserted into the clip receiver 302 in the fuel tank 104. A flat head 508 of the clip 200 holds the base 306 of the heat baffle 114 to the fuel tank 104.

Each recess 304 of the heat baffle 114 includes a wall 308. The wall 308 of the recess 304 is generally circular and inclined, with a radius $r_1$ about an axis $a_1$ at the base 306, and a radius $r_2$ about the axis $a_1$ at the planar surface 310 of the heat baffle 114, such that $r_2$ is greater than $r_1$.

In the wall 308 of the recess are at least one (1), and preferably four (4) holes 312 for receiving the distal ends 504 of spring feet 502 of the clip heat shield 400. While the embodiment shown has four (4) holes 312, more or fewer holes may be provided based upon design considerations and performance requirements. The spring feet 502 extend from the baffle side 510 of a body 506 of the clip heat shield 400. In the embodiment illustrated in FIGS. 3-7, the body 506 is planar, although the body 506 may take additional shapes as design dictates. The distal ends 504 have an outward hook 512 that engages the wall 308 of the recess 304 as the clip heat shield 400 is inserted. As inserted, the spring feet 502 are pushed inwardly until such time as the spring feet 502 enter the holes 312 in the wall 308. At that time, the spring feet 502 spring outward, illustrated by arrow A in FIG. 7, and the hooks 512 at the distal ends 504 engage a rear side 516 of the wall 308, creating an interference fit that holds the clip heat shield 400 in place. The heat clip shield 400 is not unintentionally removable during operation of the motor vehicle 100, thereby ensuring the clips 200 are protected from heat from the exhaust system 106. The clips 200 may be removed by service technician by inwardly actuating the spring feet 502 to remove engagement of the hooks 512 with the rear side 516 of the wall 308, thereby allowing the spring feet 502 to be removed from the holes 312. In an alternate embodiment, the holes 312 may be L-shaped to facilitate entry and removal of the spring feet 502 from the longer part of the holes 312, and the clip heat shield 400 is slightly rotated so the spring feet are in the shorter part of the holes 312 to prevent removal from the holes 312.

Figure 6:
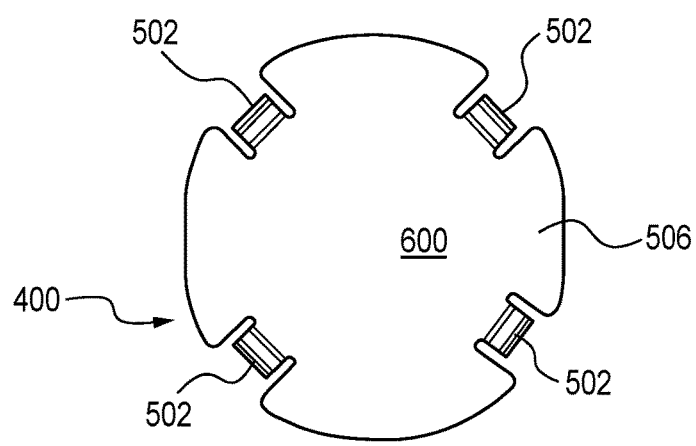
FIG. 6 is a top view of clip heat shield.
Figure 7:
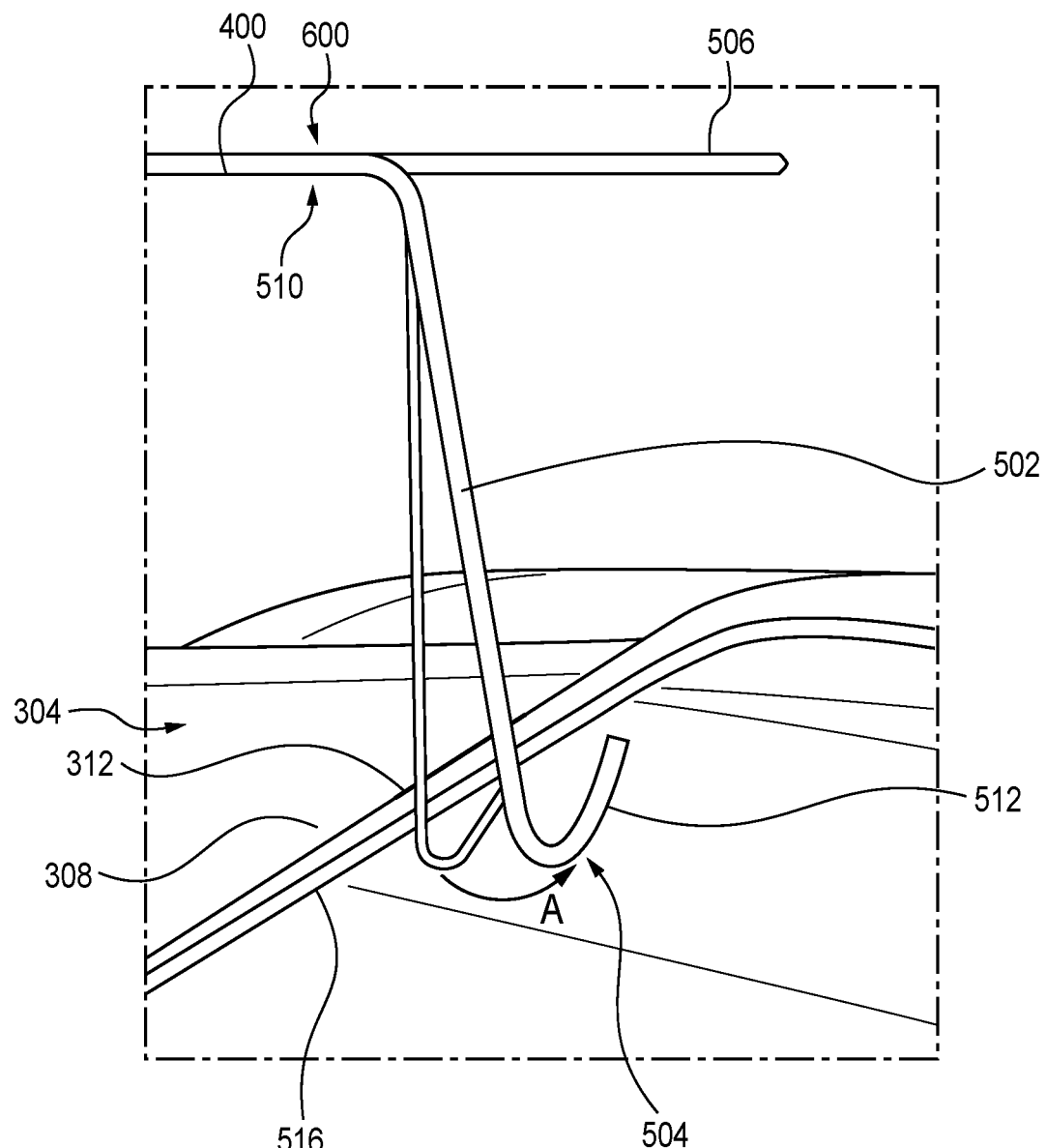
FIG. 7 is a close up of a portion of FIG. 5.

FIG. 6 is a view of the clip heat shield 400 from the exhaust side 600 of the body 506. The clip heat shield 400 may be constructed of any sufficiently heat resistant material, such as heat resistant plastic or metal.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A baffle for protecting a fuel tank of a motor vehicle from heat from an exhaust chamber of the motor vehicle, comprising:
    a baffle body;
    a clip for attaching the baffle to a fuel tank body of the fuel tank;
    a clip receiving portion formed in the baffle body having a generally frusto-conical shape, the clip receiving portion having a base portion recessed from a planar surface of the baffle, the clip receiving portion having a hole in the base through which the clip is inserted and received by the clip receiving portion in the fuel tank body and an inclined wall extending from the base to the planar surface of the baffle body, the inclined wall having a first radius about an axis perpendicular to the base at the base and a second radius about the axis at the planar surface, the second radius being greater than the first radius, the inclined wall having a hole between the planar surface and clip receiving portion; and
    a clip shield secured to the baffle body to cover the clip, the clip shield comprising:
        a solid body having a radius substantially similar to the second radius of the clip receiving portion, a front side facing the exhaust chamber, and a rear side facing the baffle body; and
        a spring foot extending from the rear side of the clip shield, the spring foot having a hook distal end that is pushed radially inward by the inclined wall as the clip shield is installed, the hook distal end of the spring foot being insertable into the hole in the inclined wall of the clip receiving portion, the hook distal end flexing radially outward when installed in the hold, the hook distal end creating an interference fit with the inclined wall to prevent unintentional removal of the clip shield.

2. The baffle of claim 1 further comprising:
   second, third, and fourth holes in the inclined wall of the baffle body; and
   second, third, and fourth spring feet extending from the rear side of the clip shield, the second, third, and fourth spring feet each having a hook distal end that is pushed radially inward by the inclined wall as the clip shield is installed, the hook distal end of each of the second, third, and fourth spring feet being insertable into the second, third, and fourth holes in the inclined wall of the baffle body.

3. The baffle of claim 2 wherein the baffle body is comprised of metal.

4. The baffle of claim 3 wherein the clip is comprised of plastic.

5. The baffle of claim 1 wherein the solid body of the clip shield is planar.

6. A baffle clip shield for protecting a clip attaching a baffle to a fuel tank to protect the fuel tank from heat from an exhaust chamber located near the fuel tank, a clip receiving portion formed in the baffle having a generally frusto-conical shape, the clip receiving portion having a base portion recessed from a planar surface of the baffle, the clip receiving portion having a hole in the base through which a clip is inserted, and an inclined wall extending from the base to the planar surface of the baffle, the inclined wall having a first radius about an axis perpendicular to the base at the base and a second radius about the axis at the planar surface, the second radius being greater than the first radius, the inclined wall having a hole between the planar surface and clip receiving portion, the baffle clip shield comprising:
   a solid body having a radius substantially similar to the second radius of the clip receiving portion, a front side facing the exhaust chamber, and a rear side facing the baffle; and
   a spring foot extending from the rear side of the baffle clip shield, the spring foot having a hook distal end that is pushed radially inward by the inclined wall as the baffle clip shield is installed, the hook distal end of the spring foot being insertable into the hole in the inclined wall of the clip receiving portion, the hook distal end moving radially outward when installed in the hole, the hook distal end creating an interference fit with the inclined wall to prevent unintentional removal of the baffle clip shield.

7. The baffle clip shield of claim 6 wherein the baffle has second, third, and fourth holes in the inclined wall of the baffle, further comprising:
   second, third, and fourth spring feet extending from the rear side of the clip shield, the second, third, and fourth spring feet each having a hook distal end that is pushed radially inward by the inclined wall as the clip shield is installed, the hook distal end of each of the second, third, and fourth spring feet being insertable into the second, third, and fourth holes in the inclined wall of the baffle.

8. The baffle clip shield of claim 7 wherein the baffle is comprised of metal.

9. The baffle clip shield of claim 8 wherein the clip is comprised of plastic.

10. The baffle clip shield of claim 6 wherein the solid body is planar.

11. A baffle clip shield for protecting a clip attaching a baffle to a fuel tank to protect the fuel tank from heat from an exhaust chamber located near the fuel tank, the baffle clip shield comprising:
    a solid body having a front side facing the exhaust chamber, and a rear side facing the baffle; and
    a spring foot extending from a rear side of the baffle clip shield, the spring foot having a hook distal end that is pushed radially inward by an inclined wall in the baffle as the clip shield is installed, the hook distal end of the spring foot being insertable into a hole in the inclined wall, the hook distal end moving radially outward when installed in the hole, the hook distal end creating an interference fit with the inclined wall to prevent unintentional removal of the baffle clip shield.

12. The baffle clip shield of claim 11 wherein the baffle has second, third, and fourth holes in the inclined wall of the baffle, further comprising:
    second, third, and fourth spring feet extending from the rear side of the baffle clip shield, the second, third, and fourth spring feet each having a hook distal end that is pushed radially inward by the inclined wall as the baffle clip shield is installed, the hook distal end of each of the second, third, and fourth spring feet being insertable into the second, third, and fourth holes in the inclined wall of the baffle.

13. The baffle clip shield of claim 12 wherein the baffle is comprised of metal.

14. The baffle clip shield of claim 13 wherein the clip is comprised of plastic.

15. The baffle clip shield of claim 14 wherein the solid body is planar.

16. The baffle clip shield of claim 14 wherein:
    a clip receiving portion formed in the baffle has a generally frusto-conical shape;
    the clip receiving portion has a base portion recessed from a planar surface of the baffle;
    the clip receiving portion has a hole in the base through which a clip is inserted; and
    the inclined wall extends from the base to the planar surface of the baffle.

17. The baffle clip shield of claim 16 wherein the inclined wall has a first radius about an axis perpendicular to the base at the base and a second radius about the axis at the planar surface, the second radius being greater than the first radius.

18. The baffle clip shield of claim 17 wherein the solid body has a radius substantially similar to the second radius of the clip receiving portion.

19. The baffle clip shield of claim 18 wherein the solid body is planar.

* * * * *